(12) United States Patent
Akitaya et al.

(10) Patent No.: US 6,429,262 B1
(45) Date of Patent: Aug. 6, 2002

(54) MOLDED POLYPROPYLENE

(75) Inventors: Shinichi Akitaya; Takanori Nakashima, both of Ichihara; Hitoshi Kuramochi, Minamata; Yoshitaka Sumi, Ichihara, all of (JP)

(73) Assignee: Chisso Corporation, Osaka (JP)

( * ) Notice: Subject to any disclaimer, the term of this patent is extended or adjusted under 35 U.S.C. 154(b) by 0 days.

(21) Appl. No.: 09/674,701

(22) PCT Filed: Apr. 28, 1999

(86) PCT No.: PCT/JP99/02267

§ 371 (c)(1),
(2), (4) Date: Nov. 6, 2000

(87) PCT Pub. No.: WO99/57195

PCT Pub. Date: Nov. 11, 1999

(30) Foreign Application Priority Data

May 7, 1998 (JP) ............................................. 10-139191

(51) Int. Cl.[7] .............................. C08L 23/10; C08J 5/18
(52) U.S. Cl. ....................................... 525/191; 525/240
(58) Field of Search ................................... 525/191, 240

(56) References Cited

U.S. PATENT DOCUMENTS 4,889,888 A * 12/1989 Bassi et al. .................... 525/75
5,654,372 A * 8/1997 Sadatoshi et al. ........... 525/323

FOREIGN PATENT DOCUMENTS

| JP | 7-30145 | 5/1988 |
| JP | 6-93061 | 4/1994 |
| JP | 6-239918 | 8/1994 |
| JP | 8-27238 | 1/1996 |

* cited by examiner

*Primary Examiner*—Nathan M. Nutter
(74) *Attorney, Agent, or Firm*—Leydig, Voit & Mayer, Ltd.

(57) ABSTRACT

A molded polypropylene having an excellent balance among various material properties including impact resistance, transparency, gloss, molding shrinkage, and whitening resistance. The molding is constituted of a material comprising a resin composition comprising 10 to 60% by weight crystalline polypropylene (matrix) and 90 to 40% by weight propylene/α-olefin copolymer (domains). The copolymer has been dispersed in the crystalline polypropylene to form domains elongated in the direction (MD) in which the resin composition flows during molding. Each domain is connected to one or more other domains at least at one site (connecting chain).

8 Claims, 5 Drawing Sheets

Cross section
parallel to
the MD direction 0.5 micron
( × 30000 )

Cross section perpendicular to the MD direction 0.5 micron
( × 30000 )

Cross section parallel to the MD direction 1 micron
( ×17500 )

Cross section perpendicular to the MD direction 1 micron
( ×17500 )

MOLDED POLYPROPYLENE

TECHNICAL FIELD

The present invention relates to a molded polypropylene. More particularly, it relates to a molded article formed of a molding material which contains a polypropylene resin having an excellent balance among various physical properties including impact resistance, transparency, gloss, molding-shrinkage, stiffness and whitening resistance.

BACKGROUND ART

Polypropylene resins are used in various fields due to the excellent characteristics and inexpensiveness. Propylene homopolymers generally have a high stiffness, but are inferior in impact resistance, particularly at low temperatures.

A propylene block copolymer called "block copolymer" in which low temperature impact resistance of a homopolymer is improved is known. The copolymer is prepared by incorporating a propylene homopolymer component at first, and then an ethylene propylene random copolymer component. This block copolymer is widely used in industrial fields including automobiles and home appliances.

Such block copolymers are excellent in impact resistance, but are inferior in transparency and gloss and more apt to produce whitening by impact of falling-down or a blow as compared with a homopolymer. Further, the copolymers have a high mold shrinkage factor, as is the case with the homopolymer. In order to improve this, a method of filling inorganic fillers such as talc or reducing an ethylene content in the random copolymer segment may be employed. The former, however, brings about a weight increase and poor appearance of the molded article due to the addition of a large amount of inorganic substance. The latter reduces the stiffness as well as the impact resistance at low temperatures, though the transparency and gloss are improved.

Relating to these problems, Japanese Patent Kokoku No. Hei 7-30145 discloses a propylene block copolymer comprising a crystalline polypropylene segment and an ethylene propylene random copolymer segment, wherein the crystalline polypropylene content is 55–95% by weight; an intrinsic viscosity ratio of both the segments, $[\eta]_{EP}/[\eta]_{PP}$, is 0.5–2.0; and the ethylene propylene random copolymer segment has a glass transition temperature of −30° C. or lower. Further, JP-A-6-93061 discloses a propylene block copolymer obtained by melt-kneading a block copolymer which is prepared by polymerizing firstly 60–80% by weight, based on the whole polymerized amount, of a polymer mainly composed of propylene, and then an ethylene propylene copolymer segment having an ethylene content of 20–50% by weight. In the block copolymer, the ethylene propylene copolymer segment has an intrinsic viscosity $[\eta]_B$ of 2.0 dl/g or more and the intrinsic viscosity ratio of the both segments, $[\eta]_B/[\eta]_A$, is 1.8 or less.

However, such propylene block copolymers have the ethylene propylene copolymer segment contents and an intrinsic viscosity ratio which are controlled almost in the same ranges. The former is improved in mechanical properties such as impact resistance and stiffness, but is still unsatisfactory in transparency, gloss and appearance. On the other hand, the latter is improved in impact resistance at low temperatures, blocking resistance and appearance, but is still unsatisfactory in stiffness. Molding shrinkage factor is also unsatisfactory in both cases.

The present invention has been made in the light of these problems in the conventional techniques, aiming to provide molded polypropylenes which are well balanced in impact resistance, transparency, gloss, molding shrinkage factor and whitening resistance.

In order to solve the above problems, the present inventors have intensively studied and found that the problem can be solved by dispersing a propylene/α-olefin copolymer in a crystalline polypropylene in a specific condition, thus achieving the present invention.

DISCLOSURE OF THE INVENTION

The molded polypropylene of the present invention is formed of a resin composition comprising 10–60% by weight of a crystalline polypropylene and 90–40% by weight of a propylene/α-olefin copolymer dispersed in the crystalline polypropylene. The molded polypropylene is characterized in that the above copolymer are dispersed to form plural domains elongated in the direction in which the resin composition flows during molding, and that each domain is connected to one or more other domains at least at one site.

Figure 1:
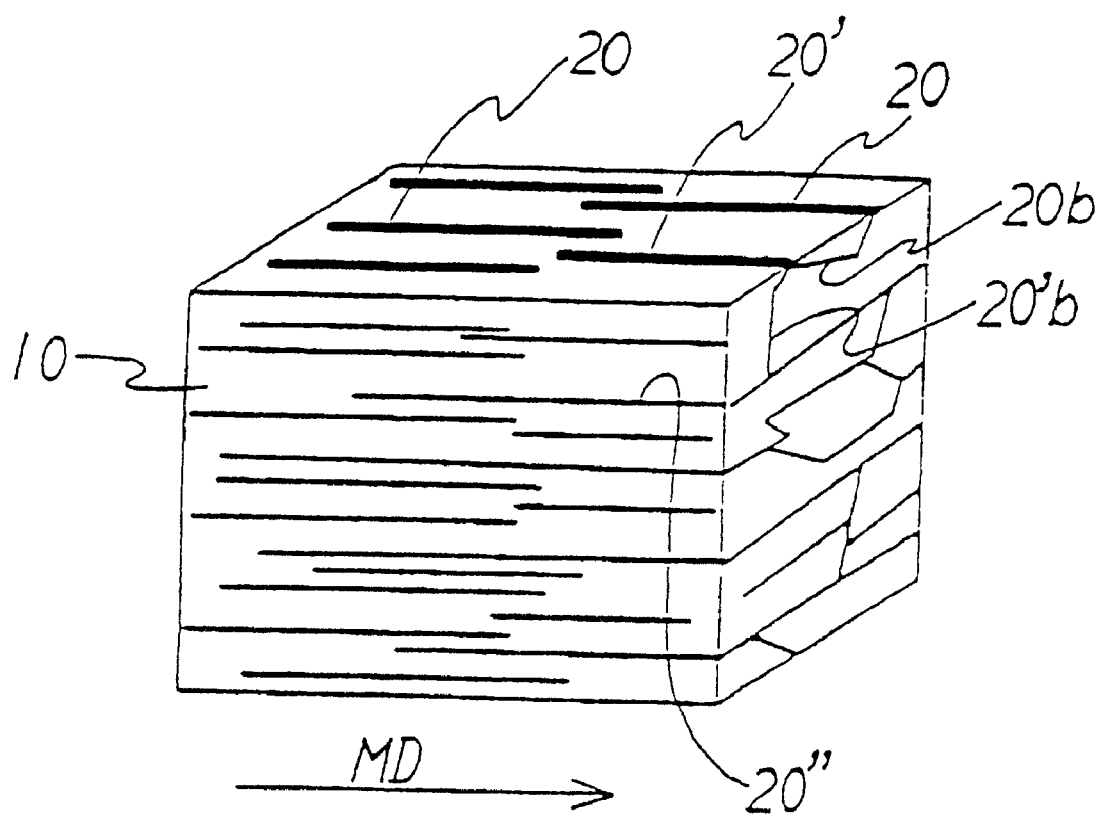
FIG. 1 is a conceptional drawing of the molded polypropylene of the present invention.

Mark 10 illustrates a matrix.

Mark 20 illustrates domains.

Mark 20b illustrates connecting branches.

BEST MODE FOR CARRYING OUT THE INVENTION

In the molded polypropylene of the present invention, the propylene/α-olefin copolymer is dispersed in the crystalline polypropylene in the specific state as mentioned above, whereby a pertinent balance among impact resistance, transparency, gloss, molding shrinkage factor, stiffness and whitening resistance can be realized.

The molded polypropylene of the present invention shall be explained below in detail.

As mentioned above, the molded article contains a crystalline polypropylene and a propylene/α-olefin copolymer and is formed of a molding material containing a resin composition comprising both the components. Concretely, domains of a propylene/α-olefin copolymer are dispersed in a matrix of a crystalline polypropylene in a specific state to form the molded article.

In this case, the crystalline polypropylene is a crystalline polymer comprising mainly polymerized propylene units, preferably 90% by weight or more of the polymerized propylene units of the total polymer. A homopolymer of propylene and a random copolymer comprising 90% by weight of propylene and less than 10% by weight of α-olefin may be acceptable.

In case of the random copolymer, the α-olefins used include ethylene, 1-butene, 1-pentene, 1-hexene, 1-octene, 1-decene, 1-dodecene, 4-methyl-1-pentene and 3-methyl-1-pentene.

From the viewpoint of manufacturing cost, a propylene homopolymer or a propylene ethylene random copolymer comprising 90% by weight or more of polymerized propylene units is preferably used.

The melt flow rate (hereinafter referred to as MFR) of the crystalline polypropylene is preferably 0.1–50 g/10 min.

As the above propylene/α-olefin copolymer, a random copolymer comprising propylene and α-olefin other than propylene can be used. In this case, the content of polymerized propylene units is preferably 20–80% by weight, more preferably 20–75% by weight, particularly preferably 20–70% by weight, relative to the total copolymer.

When the content of the polymerized propylene unit exceeds 80% by weight, the specific dispersion structure, as described below, comprising the matrix of the crystalline polypropylene and the domains of the copolymer cannot be obtained, and the transparency, tear strength, molding shrinkage factor and whitening resistance of the aimed molding may not be improved. When the content is less than 20% by weight, the domains of the copolymer are difficult to be formed, so that the impact resistance at low temperatures undesirably becomes insufficient.

The α-olefins other than propylene include ethylene, 1-butene, 1-pentane, 1-hexene, 1-octene, 1-dodecene, 4-methyl-1-pentene and 3-methyl-1-pentene.

From the viewpoint of the manufacturing cost, a propylene ethylene copolymer in which ethylene is employed as the α-olefin is used preferably.

The MFR of the propylene/α-olefin copolymer is not particularly restricted, but 0.1–20 g/10 min. is preferable.

With regard to relationship with the above crystalline polypropylene, the propylene/α-olefin copolymer is preferably selected so that the MFR ratio represented by the following formula:

PP(MFR)/RC(MFR)

wherein PP(MFR) is the MFR of the crystalline polypropylene and RC(MFR) is that of the propylene/α-olefin copolymer, becomes 10 or less, and more preferably in a range of 0.1–5.

The molding material for forming the molded polypropylene of the present invention contains the above crystalline polypropylene and the propylene/α-olefin copolymer. The content of the former is 10–60% by weight and preferably 20–50% by weight, and that of the latter is 90–40% by weight and preferably 80–40% by weight.

When the content of the propylene/α-olefin copolymer is less than 40% by weight, the expected effect cannot be obtained because the specific dispersion structure is not formed. When the content exceeds 90% by weight, the expected effect cannot be obtained because the content of the crystalline polypropylene becomes too small to form the specific dispersion structure.

The method of manufacturing such a molding material is not particularly restricted. For example, a crystalline polypropylene and a propylene/α-olefin copolymer may be each produced by polymerization separately and then mixed by melt-kneading, or may be polymerized by a continuous multi-step polymerization, to obtain the molding material.

A concrete example of the above melt-kneading method is a method of mixing a propylene/α-olefin copolymer polymerized using a Ziegler-Natta catalyst such as a titan carried catalyst or a commercially available ethylene propylene rubber with a crystalline polypropylene by melt-kneading. A concrete example of the above continuous multi-step polymerization method is a method of producing a propylene homopolymer at the first step, for example, and then producing a propylene/α-olefin copolymer at the second step using plural polymerization vessels. This continuous polymerization method is lower in manufacturing cost than the melt-kneading method, and can uniformly disperse the propylene/α-olefin copolymer in the crystalline polypropylene, thus resulting in the molded articles having the stable quality, especially an excellent transparency and tear strength. Therefore, it can be preferably employed.

Especially preferable materials among the above molding materials are those produced by the above continuous polymerization method, in which the MFR ratio of the crystalline polypropylene to the propylene/α-olefin copolymer is adjusted to 10 or less, preferably 0.1–5.

By adjusting the MFR ratio in the above range, the propylene/α-olefin copolymer is uniformly and finely dispersed in the crystalline polypropylene, to easily form the specific dispersion structure, and the resulting molding article attains a pertinent molding shrinkage, so that the film or sheet which is an example of the molded polypropylene having an excellent transparency as well as an excellent tear strength and whitening resistance can be easily obtained.

The molding material having such a MFR ratio, or specifically, the polypropylene resin material, can be produced according to the methods described, for example, in JPA-6-239918 or JPA-8-27238.

The MFR ratio is generally obtained by measuring the MFR of the crystalline polypropylene and that of the propylene/α-olefin copolymer, respectively. However, in the case that the molding material is produced in the above continuous multi-step polymerization, it is impossible to measure the MFR of the propylene/α-olefin copolymer directly. It is therefore calculated from the MFR of the crystalline polypropylene, the MFR of the above molding material and the content of the propylene/α-olefin copolymer in the molding material which can be measured directly, by the following formula.

$$\log(MFR_{RC}) = \{\log(MFR_{whole}) - (1 - W_{RC}/100)\log(MFR_{pp})\}/(W_{RC}/100)$$

In the above equation, MFRRC is the MFR of the propylene/α-olefin copolymer, $MFR_{whole}$ is the MFR of the molding material (polypropylene resin material), $MFR_{pp}$ is the MFR of the crystalline polypropylene and $W_{RC}$ is the content of the propylene/α-olefin copolymer in the polypropylene resin material.

As mentioned above, the molding material mainly comprises a crystalline polypropylene and a propylene/α-olefin copolymer. In addition to them, it can be mixed with various kinds of additives which are added to the generally used polyolefin molding material, for example, antioxidants, neutralizing agents, weathering agents, inorganic fillers, lubricants, antiblocking agents and antistatic agents.

The antioxidants can include phenolic antioxidants such as tetrakis(methylene-(3,5-di-t-butyl-4-hydroxyphenyl)propionate)methane, 2,6-di-t-butyl-4-methylphenol, n-octadecyl-3-(3',5'-di-t-butyl-4'-hydroxyphenol)propionate and tris(3,5-di-t-butyl-4-hydroxybezyl)isocyanurate, and phosphorus antioxidants such as tris(2,4-di-t-butylphenyl)phosphite, tris(nonylphenyl)-phosphite, distearylpentaerithritoldiphosphite and tetrakis(2,4-di-t-butylphenyl)-4,41-biphenylene-diphosphonite.

The neutralizing agents can include higher fatty acid salts such as calcium stearate. The inorganic fillers and the antiblocking agents can include calcium carbonate, silica, hydrotalcite, zeolite, aluminum silicate and magnesium silicate. The lubricants can include higher fatty acid amides such as stearic acid amides. The antistatic agents can include higher fatty acid esters such as glycerine monostearate.

The content of such additives to be added can be selected according to the use purpose of the molded polypropylene of the present invention such as films, sheets and injection molded products, but in general, it is preferably 0.001–5% by weight relative to the total weight of the molding material.

The method of blending the above additives into the molding material cannot be particularly restricted. For example, it can include a method of blending by a mixer having a high speed agitator such as a Henschel mixer (trade name) and by a conventional addition apparatus (dry blending method) such as a ribbon blender or a tumbler mixer, and further, a method of pelletizing by a conventional single screw extruder or twin screw extruder.

Typical examples of the molded polypropylene of the present invention can include non-oriented films, non-oriented sheets, oriented films, oriented sheets and injection molded articles.

The non-oriented films can be produced by extruding the molding material by a well-known method. For instance, they can be produced by a T-die cast method or a water cooling inflation method.

The non-oriented sheets can be produced by means of a well-known extrusion molding method, a calendering method and a casting molding method. Considering the productivity, extrusion molding is preferable.

Concretely, more preferable is a method using an apparatus which has an extruder, a T-die, a polishing roll (chilled roll), a guide roll, a take-out roll, a trimming cutter, a masking, a cutter for a decided length cut, a stacker and the like, such as a T-die method which employs a T-die sheet molding machine.

When molding non-oriented sheets, the molding material is preferably controlled in a temperature range of 180–300° C. When the temperature of the molding material is 180° C. or higher, the polypropylene resin material is sufficiently melted, so that the surface of the sheet cannot be shark skin and the good appearance can be easily obtained. When the temperature of the molding material is 300° C. or lower, thermal degradation of the polypropylene resin material is difficult to occur, so that the melt tension of the sheet can be maintained and the good moldability is easily obtained.

The temperature of the chilled roll during the sheet molding period is preferably in a range of 5–80° C. When the chilled roll temperature is 5° C. or higher, no dew is formed on the chilled roll, and therefore, the sheet can have a good appearance without any spot on the surface. When the temperature is 80° C. or lower, the sheet can be sufficiently cooled, so that a linear pattern which is often formed when undoing the rolled sheet is not observed, and therefore, the sheet can have a good appearance.

The molding rate of the sheet is preferably in a range of 0.1–100 m/min. When the molding rate is 0.1 m/min or more, a uniform sheet in thickness can easily be obtained, which reduces inferior products. When the rate is 100 m/min or less, the sheet can be sufficiently cooled, so that a linear pattern which is often formed when undoing the rolled sheet is not observed, and therefore, the sheet can have a good appearance.

The dispersion structure of the molded polypropylene of the present invention shall be explained as follows.

In the molded article, plural domains of the propylene/α-olefin copolymer, that is, plural domains composed of the copolymer in the form of a rod, a layer, etc. are dispersed in the crystalline polypropylene, as mentioned above. With regard to a copolymer domain, this domain is connected to one or more other copolymer domains at least at one site.

In FIG. 1, a conceptional drawing of the molded polypropylene is indicated. In the figure, the molded article has a morphological structure in which the propylene/α-olefin copolymer domains 20 are dispersed in the crystalline polypropylene matrix 10. Each of the domains 20 elongates in the flow direction of the resin indicated by the arrow during molding (hereinafter referred to as the MD direction).

With regard to the domain 20 in the molded article having such a structure, the domain 20 is connected with domain 20' through a connecting branch 20b. Further, the domain 20' is connected not only with domain 20 but also with another domain 20" through a connecting branch 20'b.

It is a sufficient condition for the above copolymer domain that the domain elongates in the MD direction and is connected as above. Any forms of a rod, a layer, a strip, a trough and a tube, and also a form obtained by any combination of these forms may be acceptable for the domain.

The configuration of a domain with the other domain is not particularly restricted. Both domains may be adjacent to each other, or the third domain may lie between the two domains. When the two domains are adjacent, they may form a ladder structure.

The ladder structure enables the molded article to be more improved in the tear strength than the structure in which the copolymer disperses in any form of a rod, a layer, a strip, a trough and a tube. In an especially thicker sheet, it is presumed that the delamination between layers to the direction of the surface may be difficult to occur by forming this structure.

In the cross section of this molded article parallel to the MD direction, the matrix and the domain may be substantially arranged alternately, and may form a stripe-pattern in which both of them elongate in the MD direction (refer to FIG. 1). In this case, the domain may stretch wholly in the MD direction but it may be terminated halfway.

It is presumed that an anisotropy of the molding shrinkage factor of the molded article between the MD direction and the TD direction (the direction perpendicular to the MD direction) is reduced by the formation of such a stripe-pattern. When forming such a stripe-pattern, the width of the domain in the direction perpendicular to the MD direction is preferably in a range of 0.01–5 $\mu$m. When the width deviates from the above range, the transparency and the thermal resistance of the article are unfavorably lowered.

The present inventors have found out that the molded article having the above dispersion structure, more concretely, non-oriented or oriented film, sheet or injection molded article is superior in transparency, impact resistance at low temperatures and thermal resistance, and further, in tear strength and/or whitening resistance. The molded article of the present invention has been provided based on this finding.

Accordingly, the molded article of the present invention may be produced in any process as long as it has the above dispersion structure. As mentioned above, particularly preferable is a non-oriented film or sheet as well as an injection molded article which is obtained by extruding the molding material of a polypropylene resin produced by a continuous polymerization process.

When the molded article of the present invention is a film, the thickness of the non-oriented film is preferably 10–100 $\mu$m, and more preferably 15–70 $\mu$m, considering the moldability.

When the molded article of the present invention is a sheet, the thickness of the non-oriented sheet is preferably 0.07–4 mm, more preferably 0.1–4 mm, and particularly preferably 0.1–3 mm, considering the moldability.

Some uses of the molded polypropylene of the present invention shall be explained.

Among the non-oriented molded articles, the non-oriented film is preferably used as a material for packaging vegetables, bread and frozen food, etc. because it has a good transparency and thermal resistance as well as superiority in low temperature resistance and tear strength.

The non-oriented sheet is preferably used for stationeries such as files and industrial materials such as food packages and decorative papers because it has a good thermal resistance as well as superiority in low temperature resistance (impact resistance at low temperatures), whitening resistance and transparency.

The injection molded article is preferably used for transparent clothes cases, tool boxes, parts having hinge and materials for hinge.

The film or the sheet of the present invention can be used for a multilayer film or sheet by laminating either or both sides of the film or sheet with the other film or sheet comprising the other resin.

The other resin used is not particularly restricted and various kinds of resins are applicable. For example, a multilayer film is produced by laminating a heat adhesive resin such as a propylene/α-olefin copolymer having a lower melting point on the film of the present invention, and the resulting film can be used for various kinds of package materials.

The applicable method of manufacturing such a multilayer film or a multilayer sheet includes a inline laminating method and a coextrusion method in which lamination is carried out during the production of the film or the sheet, and a dry laminating method in which lamination is carried out after production of the film or the sheet.

The molded article of the present invention, that is, the above multilayer film or sheet can be given a surface treatment such as a corona discharge treatment, a flame treatment and a plasma treatment by a conventional method which is employed industrially. These treatments can improve the printability, laminate properties and metal vapor deposition properties.

The injection molded article of the present invention can be coated with paint and primer which are usually used for polypropylene, whereby the article can be improved in industrial design.

The present invention shall be explained in detail according to the following examples and comparative examples but cannot be restricted to the examples.

EXAMPLES 1–3

Comparative Examples 1 and 2

[Production of molding materials]

Various kinds of additives shown below were added to the polypropylene resin materials having a polymer component indicated in Table 1. The materials were mixed using a Henschel mixer (trade name), and melt-kneaded and extruded into pellet using a single screw extruder having an aperture of 40 mmφ. The molding materials for molded polypropylene were thus obtained in Examples and Comparative Examples, respectively. But the polymer component of Comparative Example 2 shall be indicated later.

The additives used are 0.1% by weight of 2,6-di-t-butyl-p-cresol as a phenolic oxidation inhibitor and 0.1% by weight of calcium stearate as a neutralizing agent.

The polypropylene resin materials used were obtained by carrying out a continuous polymerization in which the crystalline polypropylene was produced by polymerization in the first step and the propylene ethylene copolymer was produced by polymerization in the second step.

In Table 1, T-MFR indicates a MFR of the whole polypropylene resin; T-C2" does an ethylene content of the whole polypropylene resin; PP does the crystalline polypropylene; PP-MFR and PP-C2" do a MFR and an ethylene content of PP, respectively; RC does the propylene-ethylene copolymer; RC-MFR and RC-C2" do a MFR and an ethylene content of RC, respectively; and RC-Seg does a content of RC.

Regarding the component of the polypropylene resin of Comparative Example 2 mentioned above, T-C2" is 6.8% by weight, RC-C2" is 50% by weight and RC-Seg is 13.6% by weight. Further, T-MFR is 2.6 g/10 min, PP-MFR is 5.4 g/10 min and RC-MFR is 0.03 g/10 min.

[Production of injection molded articles]

The pellet was injection molded into test pieces having a shape described in JIS under a condition of a melt resin temperature of 230° C. and a mold temperature of 50° C. Then the test pieces were conditioned by leaving for 72 hrs. in a room kept at a relative humidity of 50% and a temperature of 23° C.

The properties of the test pieces (injection molded articles) obtained in Examples and Comparative Example were evaluated, which results are shown in Table 1.

TABLE 1

|  | Example 1 | Example 2 | Example 3 | Comparative Example 1 |
|---|---|---|---|---|
| T-MFR (g/10 min) | 0.61 | 0.50 | 0.56 | 2.50 |
| PP-MFR (g/10 min) | 0.75 | 0.49 | 0.55 | 7.1 |
| RC-MFR (g/10 min) | 0.46 | 0.51 | 0.57 | 0.03 |
| T-C2" (wt %) | 16.3 | 18.8 | 22.0 | 10 |
| RC-C2" (wt %) | 38.1 | 37.1 | 35.4 | 50 |
| RC-Seg. (wt %) | 42.8 | 50.7 | 62.1 | 20 |
| Flexural Modulus (Mpa) | 405 | 307 | 229 | 837 |
| Flexural Strength (Mpa) | 10.8 | 8.1 | 6.4 | 24.4 |
| Tensile Strength (Mpa) | 20.0 | 18.0 | 15.6 | 22.4 |
| Tensile Elongation (%) | 796 | >800 | >800 | >800 |
| Weld Tensile Strength (Mpa) | 9.4 | 7.3 | 5.6 | 20.3 |
| Weld Tensile Elongation (%) | 21.8 | 23.8 | 22.1 | 29.8 |
| Izod Impact 23° C. (Kj/m$^2$) | N.B. | N.B. | N.B. | N.B. |
| 0° C. (Kj/m$^2$) | N.B. | N.B. | N.B. | 16.4 |
| −30° C. (Kj/m$^2$) | N.B. | N.B. | N.B. | 9.7 |
| Specific Gravity | 0.885 | 0.883 | 0.880 | 0.895 |
| Hardness (R) | Too soft to measure | Too soft to measure | Too soft to measure | 75 |
| (D) | 51 | 46 | 41 |  |
| Gloss (%) | 85 | 84 | 81 | 76 |
| Haze (%) | 60 | 51 | 47 | 91 |
| Molding Shrinkage factor (1/1000) | 7.95 | 7.00 | 5.78 | 14.8 |

[Production of non-oriented film]

The pellet was melt-extruded using a single screw extruder having an aperture of 65 mmφ equipped with a T-die, and then it was cooled down to be solid using an air chamber and a chilled roll having a surface temperature of 30° C., thus producing a non-oriented film 100 μm thick.

The properties of the non-oriented films obtained by such a method in Example 1 and Comparative Example 2 were evaluated, which results are shown in Table 2.

TABLE 2

| 23° C. | | Example 1 | Comparative Example 2 |
|---|---|---|---|
| Tensile strength at yield point (N/mm$^2$) | MD | 13 | 25 |
| | TD | 9 | 22 |
| Tensile strength at break (N/mm$^2$) | MD | 22 | 27 |
| | TD | 15 | 25 |
| Tensile elongation at break (%) | MD | 420 | 490 |
| | TD | 530 | 590 |
| Young's modulus (N/mm$^2$) | MD | 310 | 750 |
| | TD | 190 | 640 |
| Elmendorf tear strength (N) | MD | 23 | 16 |
| | TD | 98 | 42 |
| Haze (%) | Total | 30 | 71 |
| | Inside | 3 | 27 |

[Production of non-oriented sheet]

The pellet was molded by a T-die method using a sheet molding machine equipped with a T-die and a polishing roll under a condition of a cylinder temperature of 230° C. and a chilled roll temperature of 25–35° C. to obtain a sheet 0.6 mm thick.

The non-oriented sheets obtained in Examples and Comparative Example were conditioned similarly to the test pieces of the injection molded articles, and then the properties were evaluated, which results are shown in Table 3.

TABLE 3

| | Example 1 | Example 2 | Example 3 | Comparative Example 1 |
|---|---|---|---|---|
| Thickness (mm) | 0.646 | 0.647 | 0.653 | 0.594 |
| Specific gravity | 0.883 | 0.879 | 0.877 | 0.893 |
| Gloss (%) | | | | |
| Face | 86 | 80 | 77 | 90 |
| Reverse | 71 | 76 | 72 | 77 |
| Haze (%) | | | | |
| Total | 70 | 63 | 60 | 95 |
| Inside | 68 | 61 | 59 | 95 |
| Tensile strength at yield point (N/mm$^2$) | | | | |
| MD | 18.1 | 15.2 | 15.2 | 26.3 |
| TD | 12.1 | 9.4 | 7.9 | 23.4 |
| Tensile strength at break (N/mm$^2$) | | | | |
| MD | 29.6 | 25.5 | 22.8 | 35.8 |
| TD | 20.2 | 17.6 | 14.9 | 29.6 |
| Tensile elongation at break (%) | | | | |
| MD | 555 | 574 | 594 | 631 |
| TD | 833 | 883 | 920 | 785 |
| Young's modulus (N/mm$^2$) | | | | |
| MD | 322 | 243 | 192 | 730 |
| TD | 261 | 170 | 124 | 680 |
| Average | 292 | 207 | 158 | 705 |
| Tear strength (N) | | | | |
| MD | 15 | 16 | 13 | 24 |
| TD | 73 | 79 | 56 | 105 |
| Punching impact strength (J) | | | | |
| 23° C. | >2.94 | >2.94 | >2.94 | >2.94 |
| 0° C. | >2.94 | >2.94 | >2.94 | >2.94 |
| -10° C. | >2.94 | >2.94 | >2.94 | >2.94 |
| -20° C. | >2.94 | >2.94 | >2.94 | >2.94 |
| -30° C. | >2.94 | >2.94 | >2.94 | >2.94 |
| Whitening resistance | No whitening | No whitening | No whitening | Strong whitening |

[Evaluation of molding material]

(MFR)

The MFR was measured under a condition of a test temperature of 230° C. and a test load of 2.16 Kgf according to JIS K 6758.

[Evaluation of injection molded article]

The flexural modulus, the flexural strength, the tensile strength at yield point, the tensile elongation at break, the notched izod impact strength and the specific gravity were measured according to JIS K 6758.

The hardness was measured as Durometer hardness according to JIS K 6760 and as Rockwell hardness according to JIS K 6758. The gloss was measured at an indicator angle of 600 according to JIS Z 8741.

The haze was measured according to JIS K 7105 using a tabular sample of 25×50×1 cm made under the above condition for injection molding.

The molding shrinkage factor was calculated by the following equation in which the ratio of the length obtained by subtracting the whole length of the test piece for the tensile test (No. 1 test piece for tensile test of JIS K-7113) made under the above condition from the whole length of the mold of the molding machine, to the length of the mold are multiplied by 100.

Molding shrinkage factor=(Whole length of mold−Whole length of test piece)×100/(Whole length of mold)

[Evaluation of non-oriented film]

The tensile strength at yield point, the tensile strength at break, the tensile elongation at break and the Young's modulus were all measured according to ASTM D 882. The Elmendorf tear strength was measured according to ASTM D 781 and the haze was according to ASTM D 1003, respectively.

Figure 2:
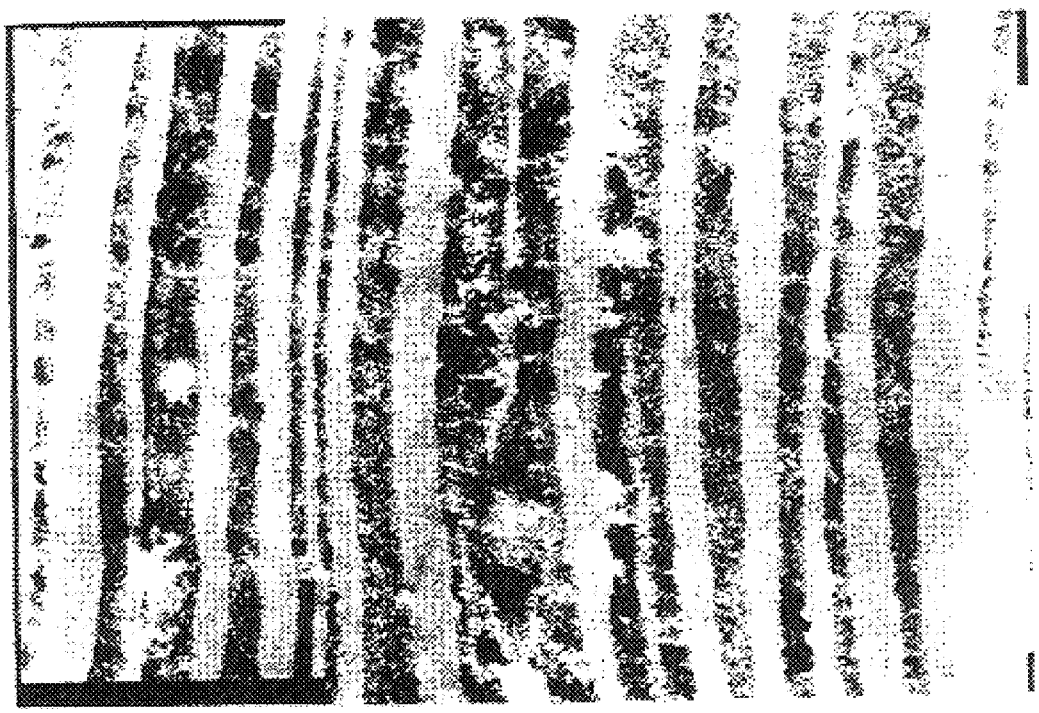
FIG. 2 is a transmission electron microscope photograph of a cross section parallel to the MD direction of a non-stretched film of the present invention in the Example.
Figure 3:
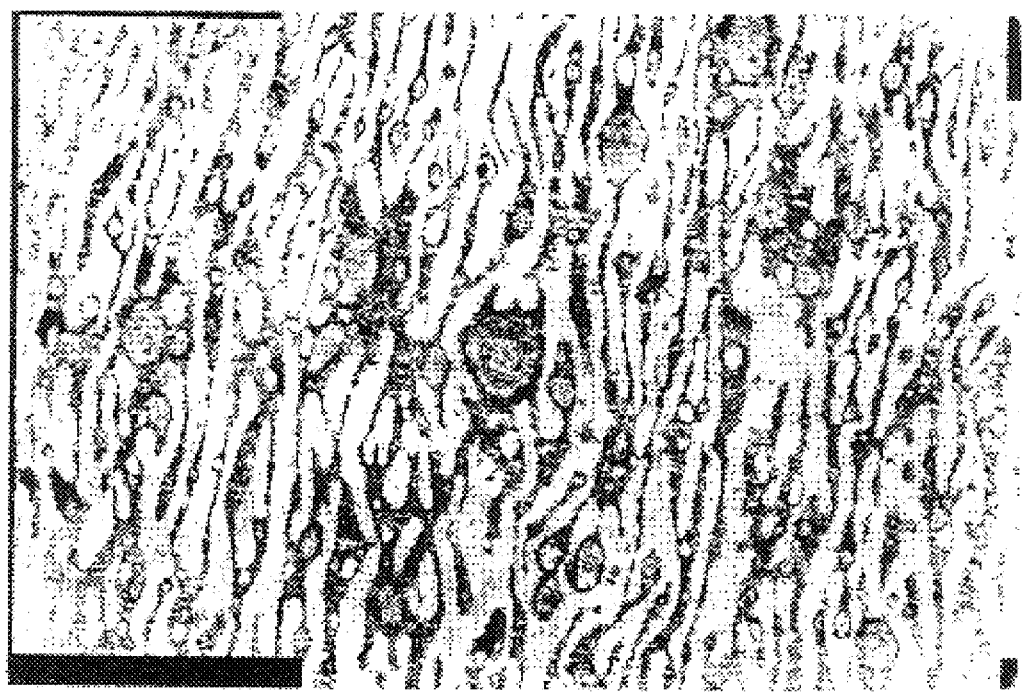
FIG. 3 is a transmission electron microscope photograph of a cross section perpendicular to the MD direction of a non-stretched film of the present invention in the Example.

In order to observe the dispersion structure of the RC domain, the non-oriented film of Example 2 was cut on the side parallel to or perpendicular to the MD direction, dyed with a Ruthenium compound (RuO$_4$) for 48 hours, and further cut into ultrathin sections about 100 nm thick by a diamond knife using a ultra-microtome. The obtained ultrathin section was observed through a TEM (transmission electron microscope, trade name: JEOLJEM100CX) of 5000 magnifications. Among the resultant electron micrographs, the micrograph of the cross section parallel to the MD direction is shown in FIG. 2 and that of the cross section perpendicular to the MD direction is in FIG. 3, respectively.

Figure 4:
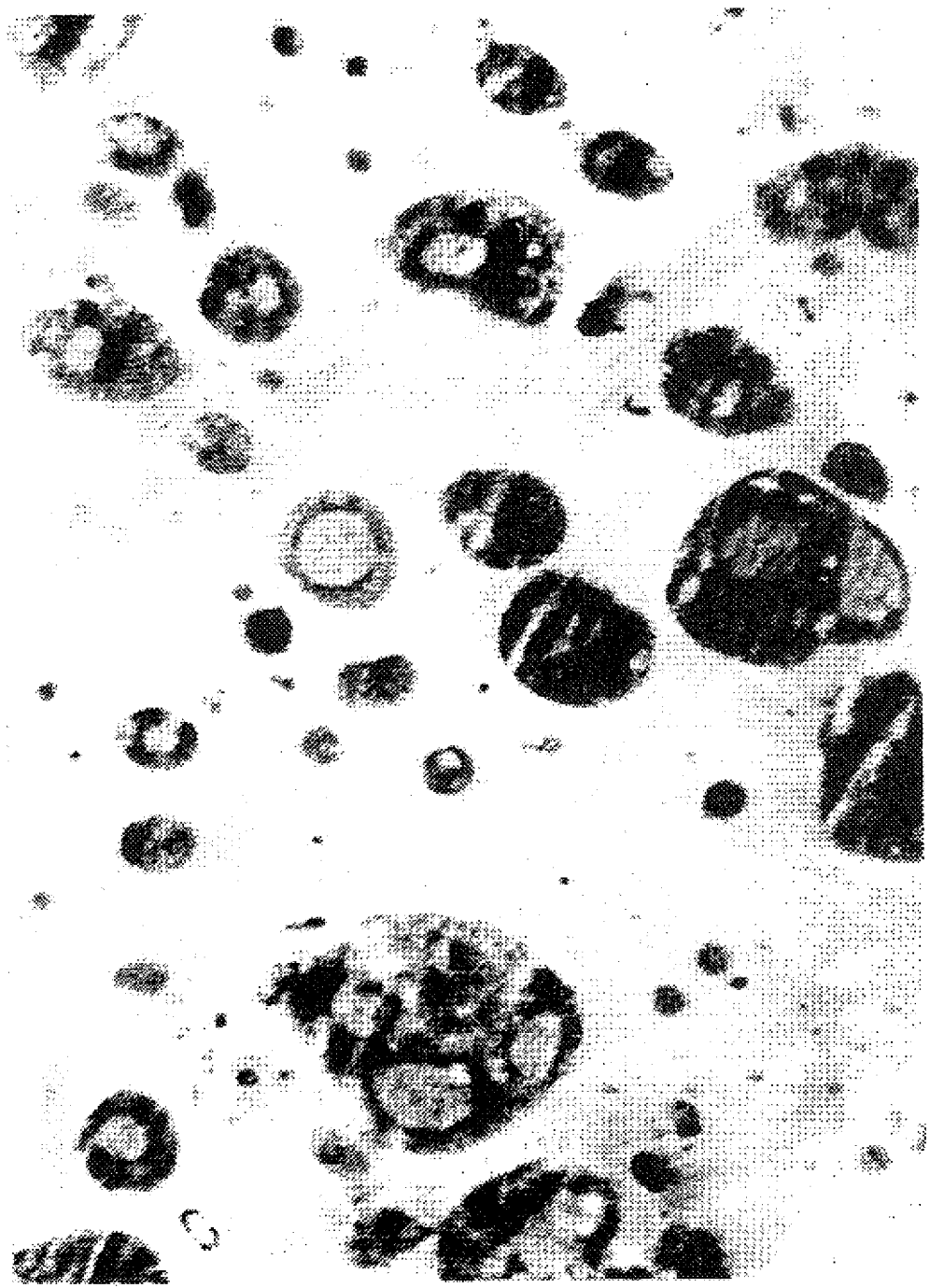
FIG. 4 is a transmission electron microscope photograph of a cross section parallel to the MD direction of a non-stretched film in Comparative Example 1.
Figure 5:
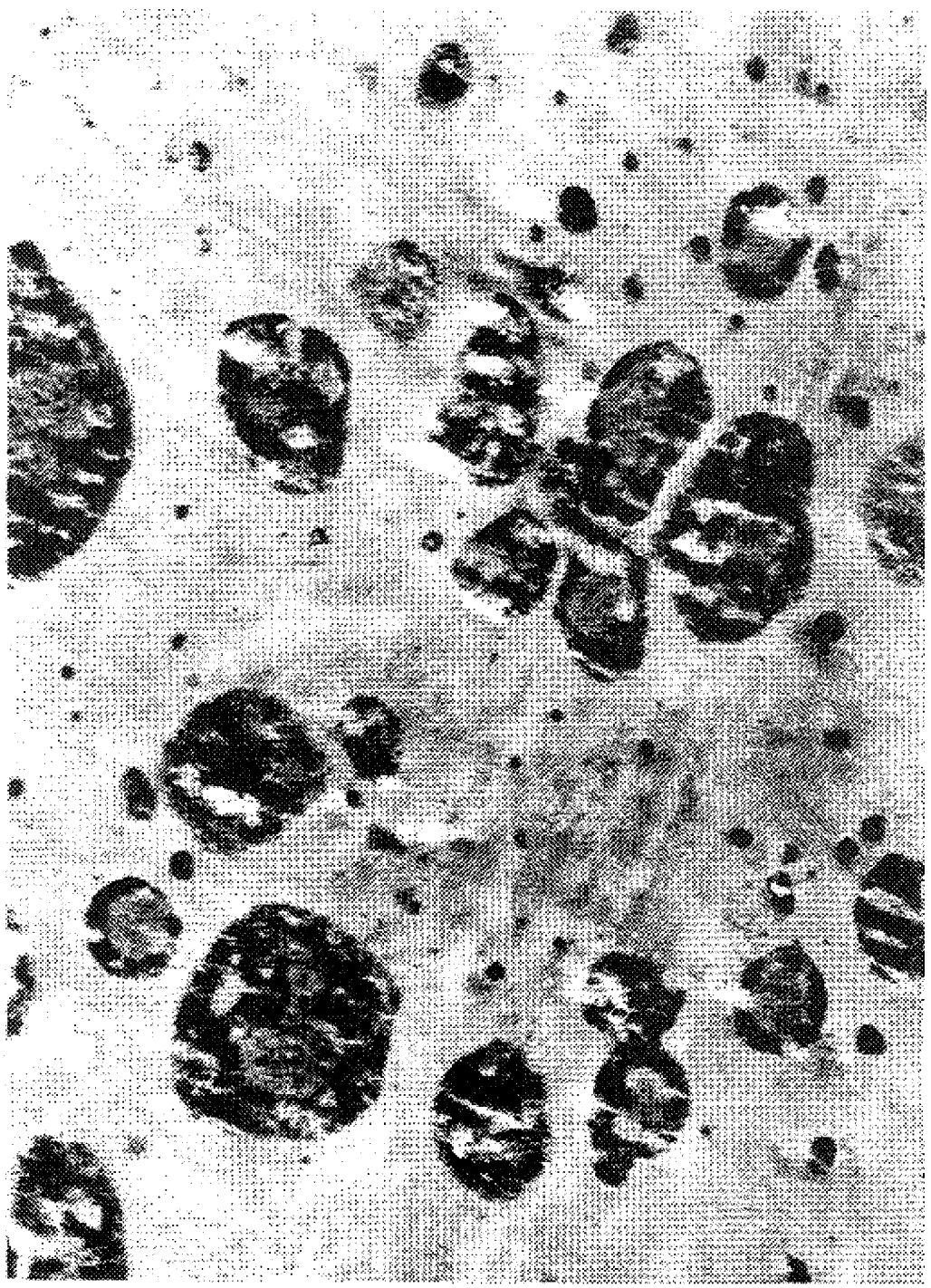
FIG. 5 is a transmission electron microscope photograph of a cross section perpendicular to the MD direction of a non-stretched film of Comparative Example 1.

The electron micrographs of Comparative Example 1 were obtained in a similar manner. The micrograph of the cross section parallel to the MD direction is shown in FIG. 4, and that of the cross section perpendicular to the MD direction is in FIG. 5, respectively.

[Evaluation of non-oriented sheet]

The tensile strength at yield point, the tensile strength at break, the tensile elongation at break and the Young's modulus were all measured according to ASTM D 882.

The Elmendorf tear strength was measured according to ASTM D 781, the haze was according to ASTM D 1003 and the punching impact strength was according to ASTM D 781, respectively.

Regarding the whitening resistance, a bending whitening test was carried out in which the sheet was bent five times by hand at an angle of 180° and the state of whitening was observed with the naked eye.

As shown in Table 1, the injection molded articles of Examples 1–3 are higher in gloss, favorably lower in haze which is an index of transparency, favorably lower in molding shrinkage and higher in izod impact strength at low temperatures than that of Comparative Example 1.

The injection molded articles belonging to the present molded polypropylene are thus proved to be excellent in impact resistance at low temperatures, transparency, gloss and molding shrinkage factor.

When the non-oriented film of Example 1 is compared with that of Comparative Example 2 in Table 2, the former is excellent in haze and tear strength, and both are comparable in the other properties.

The non-oriented films belonging to the present molded polypropylene are thus proved to be excellent in transparency and tear strength, comparable to conventional non-oriented films in the other properties, and well balanced in various kinds of properties.

When the non-oriented sheets of Examples 1–3 are compared with that of Comparative Example 1, it is apparent that the former is excellent in haze and whitening resistance, and that both are comparable in punching impact strength at low temperatures and tear strength.

The non-oriented sheets belonging to the present molded polypropylene are thus proved to be excellent in transparency and whitening resistance, comparable to conventional non-oriented sheets in the other properties including punching impact strength at low temperatures, and well balanced in various kinds of properties.

As described above, the present invention, wherein the propylene/α-olefin copolymer is dispersed in the crystalline polypropylene in a specific state, can provide the molded polypropylene having well balanced properties including impact resistance, transparency, gloss, molding shrinkage factor and whitening resistance.

What is claimed is:

1. A molded polypropylene containing a resin composition comprising 10–60% by weight of a crystalline polypropylene and 90–40% by weight of a propylene/α-olefin copolymer, wherein the copolymer is dispersed in the crystalline polypropylene to form plural domains elongated in the direction in which the resin composition flows during molding, and each domain is connected to one or more other domains at least at one site.

2. The molded polypropylene according to claim 1, wherein the domains are at least in one form selected from the group consisting of a rod, a layer, a strip, a trough and a tube.

3. The molded polypropylene according to claim 1, wherein any domains are connected to adjacent domains.

4. The molded polypropylene according to claim 1, wherein the crystalline polypropylene and the copolymer are substantially arranged alternately to form a stripe pattern elongated in the flow direction of the resin composition in a cross section parallel to the flow direction.

5. The molded polypropylene according to claim 1, wherein the melt flow rate of the crystalline polypropylene and that of the copolymer have a relation expressed by the following equation:

$$PP(MFR)/RC(MFR) \leq 10$$

wherein PP(MFR) denotes the melt flow rate of the crystalline polypropylene and RC(MFR) denotes the melt flow rate of the propylene/α-olefin copolymer.

6. The molded polypropylene according to claim 1, wherein the copolymer contains 20–80% by weight of polymerized propylene units.

7. The molded polypropylene according to claim 1, which is a film having a thickness of 10–100 μm.

8. The molded polypropylene according to claim 1, which is a sheet having a thickness of 0.1–4 mm.

* * * * *